United States Patent
Tene et al.

(10) Patent No.: US 8,572,605 B1
(45) Date of Patent: Oct. 29, 2013

(54) SOURCE SWITCHING OF VIRTUAL MACHINES

(75) Inventors: Gil Tene, San Carlos, CA (US); Shyam Prasad Pillalamarri, Los Altos Hills, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 2281 days.

(21) Appl. No.: 11/118,624

(22) Filed: Apr. 28, 2005

(51) Int. Cl.
*G06F 9/455* (2006.01)

(52) U.S. Cl.
USPC .......................................................... 718/1

(58) Field of Classification Search
USPC .......................................................... 718/1
See application file for complete search history.

(56) References Cited

U.S. PATENT DOCUMENTS

| | | | | |
|---|---|---|---|---|
| 6,167,438 A | * | 12/2000 | Yates et al. | 709/216 |
| 6,209,035 B1 | * | 3/2001 | Terakita | 709/227 |
| 6,950,436 B2 | * | 9/2005 | Kitai et al. | 370/400 |
| 6,999,998 B2 | * | 2/2006 | Russell | 709/213 |
| 7,103,680 B1 | * | 9/2006 | Holdsworth et al. | 709/246 |
| 7,237,262 B2 | * | 6/2007 | Lahti et al. | 726/13 |
| 7,251,745 B2 | * | 7/2007 | Koch et al. | 714/11 |
| 7,349,948 B2 | * | 3/2008 | Bussani et al. | 709/217 |
| 7,406,523 B1 | * | 7/2008 | Kruy et al. | 709/227 |
| 2002/0040352 A1 | * | 4/2002 | McCormick | 705/80 |
| 2004/0267866 A1 | * | 12/2004 | Carollo et al. | 709/200 |

OTHER PUBLICATIONS

Workstation 4 User's Manual, VMware, Inc., Copyright 1998-2003.*

* cited by examiner

*Primary Examiner* — Gregory A Kessler
(74) *Attorney, Agent, or Firm* — Van Pelt, Yi & James LLP

(57) ABSTRACT

Stitching a proxied connection between a first core virtual machine (VM) and a second core VM is disclosed. Stitching includes determining that a stitched connection should be generated between the first core VM and the second core VM and generating the stitched connection between the first core VM and the second core VM.

30 Claims, 6 Drawing Sheets

SOURCE SWITCHING OF VIRTUAL MACHINES

BACKGROUND OF THE INVENTION

In many computing environments, information may be passed from one device to another typically more powerful device to perform certain computing tasks, such as processing, storage, or communication. Such information may include processes, data, functions, or any other information that consumes computing resources. Information may be sent in packet form or in some other type of data stream in various applications. For example, a virtual machine (VM) may be segmented into two segments: a shell VM and a core VM. Function calls to the shell VM may be passed to the core VM for processing. Segmented virtual machines are further described in U.S. patent application Ser. No. 10/378,061 entitled SEGMENTED VIRTUAL MACHINE, which is incorporated herein by reference for all purposes.

FIG. 1A is a block diagram illustrating a system including a segmented virtual machine 100. In this example, VM functionality is segmented into shell VM 108 and core VM 112. Shell VM 108 performs interactions with the external environment, such as with external application 104. A shell VM is sometimes referred to as a proxy. Core VM 112 performs VM internal execution functions. External interactions may be passed from external application 104 through shell VM 108 to core VM 112 for processing. For example, file or network I/O, operating system calls, and other native library interactions may be passed to core VM 112. In J2EE and Java server environments, many of these forwarded interactions may be TCP/IP connection packets (to/from web tier, DB tiers, clustering traffic, etc.). Forwarding these interactions through shell VM 108 results in overhead, which reduces the efficiency of the segmented VM. It would be desirable to reduce the overhead associated with forwarding certain types of interactions through the shell VM.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer-readable medium such as a computer-readable storage medium or a computer network wherein program instructions are sent over optical or electronic communication links In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
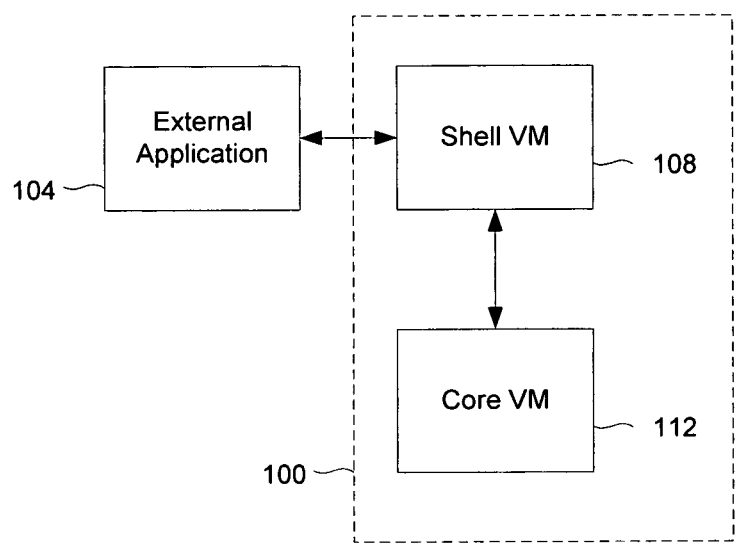
FIG. 1A is a block diagram illustrating a system including a segmented virtual machine.
Figure 1B:
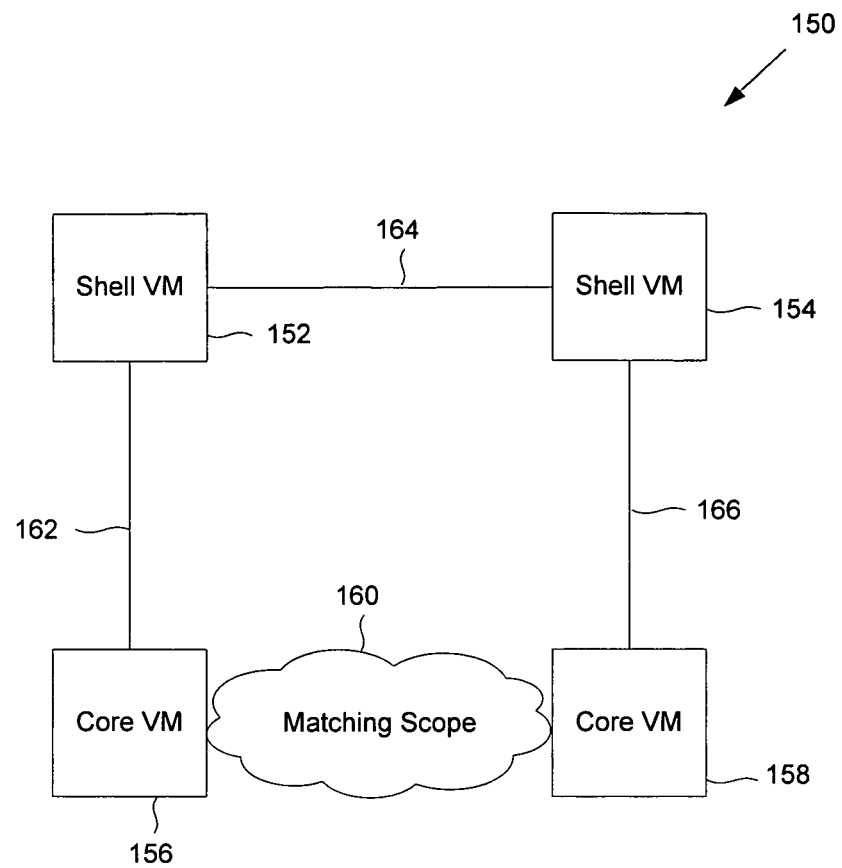
FIG. 1B is a block diagram illustrating two virtual machines.

FIG. 1B is a block diagram illustrating two virtual machines. In this example, system 150 is shown to include a VM that includes shell VM 152 and core VM 156, and a VM that includes shell VM 154 and core VM 158. Each VM runs an application. Interactions between the two applications running on the two core VMs are passed through shell VM 152 and shell VM 154.

Shell VM 152 and core VM 156 communicate over path 162. Shell VM 152 and shell VM 154 communicate over path 164. Shell VM 154 and core VM 158 communicate over path 166. Communication over paths 162-166 could be via TCP/IP, UDP, or any other communication protocol. Each of paths 162-166 could include one or more channels. Multiple channels could be multiplexed onto one path. For example, a channel could carry a network socket connection, external file descriptor communication, or a TCP/IP connection. In some embodiments, there is more than one path between core VM 156 and shell VM 152, shell VM 152 and shell VM 154, and/or shell VM 154 and core VM 158. In some embodiments, each core VM includes a backend core VM and a conduit for terminating a TCP/IP connection. The conduit can perform any of the processes associated with source switching.

Core VM 156 and core VM 158 interact with other members of matching scope 160. In some embodiments, a conduit on core VM 156 and a conduit on core VM 158 interact with devices in matching scope 160. Matching scope 160 is a set of applications, core VMs, and/or core devices (e.g., hosts) that are allowed to be source switched to each other. Source switching refers to the fact that the source (in this case, the core VM) can identify and determine when a connection can be switched to a stitched connection). In this example, matching scope 160 includes core VM 156 and core VM 158. The members of matching scope 160 may be designated by a policy. Multiple matching scopes may exist where each matching scope is controlled by a policy. Multiple matching scopes can exist in one device.

Shell VM 152, core VM 156, shell VM 154, and core VM 158 may reside on any number of physical devices (i.e., hardware). For example, core VM 156 and core VM 158 could reside on the same core device, while shell VM 152 and shell VM 154 could reside on the same or separate shell device(s). Shell VM 152, core VM 156, shell VM 154, and core VM 158 could all reside on the same device.

In some embodiments, system 150 is part of an application server cluster, in which multiple instances of the same application run on multiple hosts (e.g., segmented VMs). The hosts communicate which each other frequently to synchronize state. In some embodiments, system 150 is part of a messaging bus in which multiple applications communicate with each other through a hub, such as a Java Messaging Service (JMS) hub. The applications could run on multiple segmented VMs with high messaging traffic between the segmented VMs.

Figure 1C:
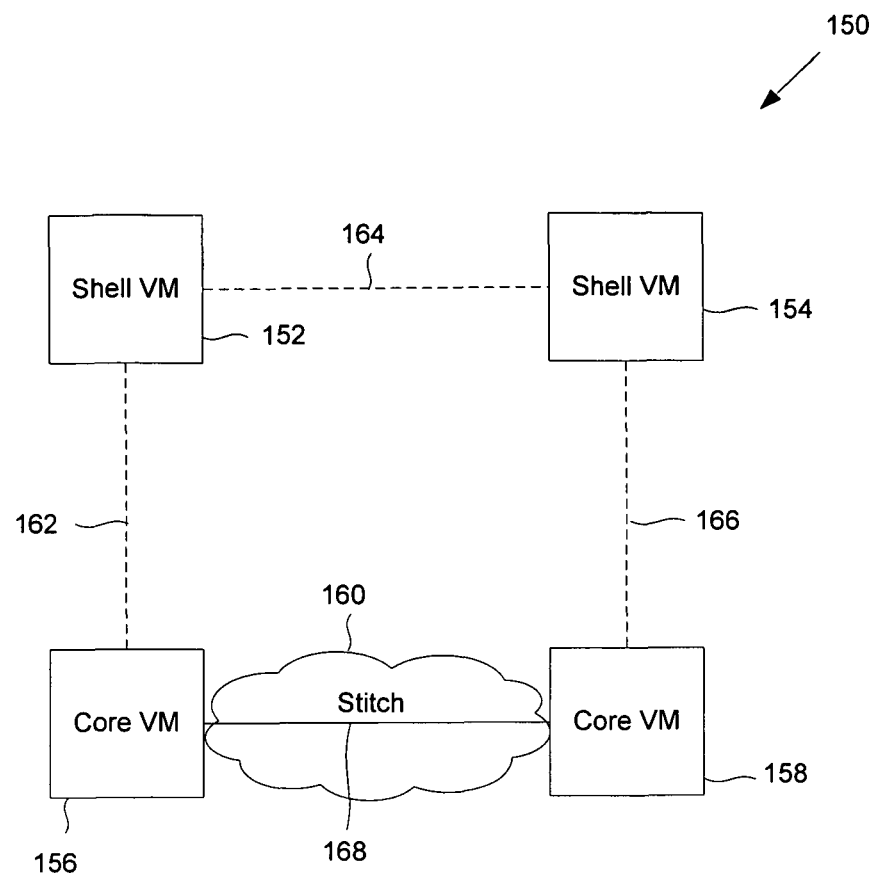
FIG. 1C is a block diagram illustrating two virtual machines with a stitched connection.

FIG. 1C is a block diagram illustrating two virtual machines with a stitched connection. In this example, system 150 is shown with stitch (or stitched connection) 168 between core VM 156 and core VM 158. Interactions between the two applications running on the two core VMs can be sent over stitched connection 168. Stitched connection 168 may be a TCP connection or any other type of connection. Using the stitched connection for communication between the two core VMs increases the uplift factor and reduces the overhead in the system. Data exchanged between the two core VMs does not need to be sent through the two shell VMs over paths 162-166. In some embodiments, stitched connection 168 behaves identically or similarly to the original connection so that stitched connection 168 is transparent to the applications running on core VM 156 and core VM 158. In some embodiments, both core VMs are located on the same physical device, in which case the stitched connection could be over a shared memory interface.

A centralized or peer-to-peer method can be used to identify when a stitch can be made. In the centralized case, a matching server (not shown) interacts with the core VMs in matching scope 160. The matching server can identify when a stitched connection between two core VMs in matching scope 160 can be made, and coordinate the stitching process, as more fully described below. In the peer-to-peer case, a core VM (or conduit on the core VM) can identify when a stitched connection between two core VMs in matching scope 160 can be made, as more fully described below.

Figure 2:
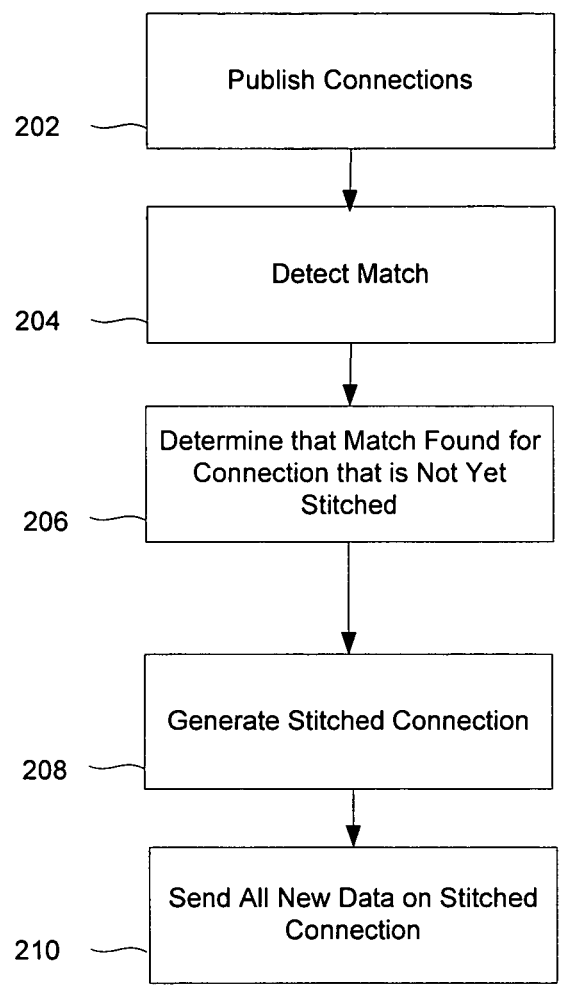
FIG. 2 is a flowchart illustrating a process of stitching a connection.

FIG. 2 is a flowchart illustrating a process of stitching a connection. In some embodiments, this process can be used to generate stitched connection 168 in system 150. In this example, connections (e.g., connection descriptions) are published (202). The connections could be published periodically or at other intervals. Publishing could include broadcasting, multicasting, or publishing in a messaging system. For example, each member in matching scope 160 could broadcast a list of its connections. The connections could be multicast to members of a matching scope. The connections could be published to subscribing members. In some embodiments, only long-lived connections are published.

A connection description could be published, which includes a connection identifier, such as a TCP 4-tuple or 5-tuple. For example, the connection description could include a source address, source port, destination address, and destination port. The addresses could be IP addresses or any addresses associated with any other communication protocol. The connection description could include the age of the connection. For example, in system 150, core VM 156 and core VM 158 could each publish its connection descriptions to matching scope 160.

A match is detected (204). A match is detected when one connection description is symmetric to another connection description. In other words, the source of one connection description is the destination of the other connection description, and vice versa. For example, core VM 156 publishes a connection description with source address A, source port B, destination address C, and destination port D (A:B, C:D). Core VM 158 publishes a connection description with source address C, source port D, destination address A, and destination port B (C:D, A:B). A match would be detected between these two connection descriptions since they are symmetric.

The detection can be centralized or peer-to-peer detection. In the peer-to-peer case, a core VM within matching scope 160 detects the match. In the centralized case, a matching server monitors the published messages (e.g., connection descriptions) sent from members of matching scope 160. When the matching server detects a match between two connection descriptions, it notifies one of the core VMs. The core VM detects a match based on the notification.

It is determined that a stitched connection corresponding to the match does not already exist (206). If it is determined there is not already a stitched connection to the other core VM, a stitched connection is generated (208), as more fully described below. All new data is sent over the stitched connection (210).

In some embodiments, stitched connections are multiplexed within paths between cores, similar to how connections can be multiplexed within paths between the shell and the core.

Figure 3:
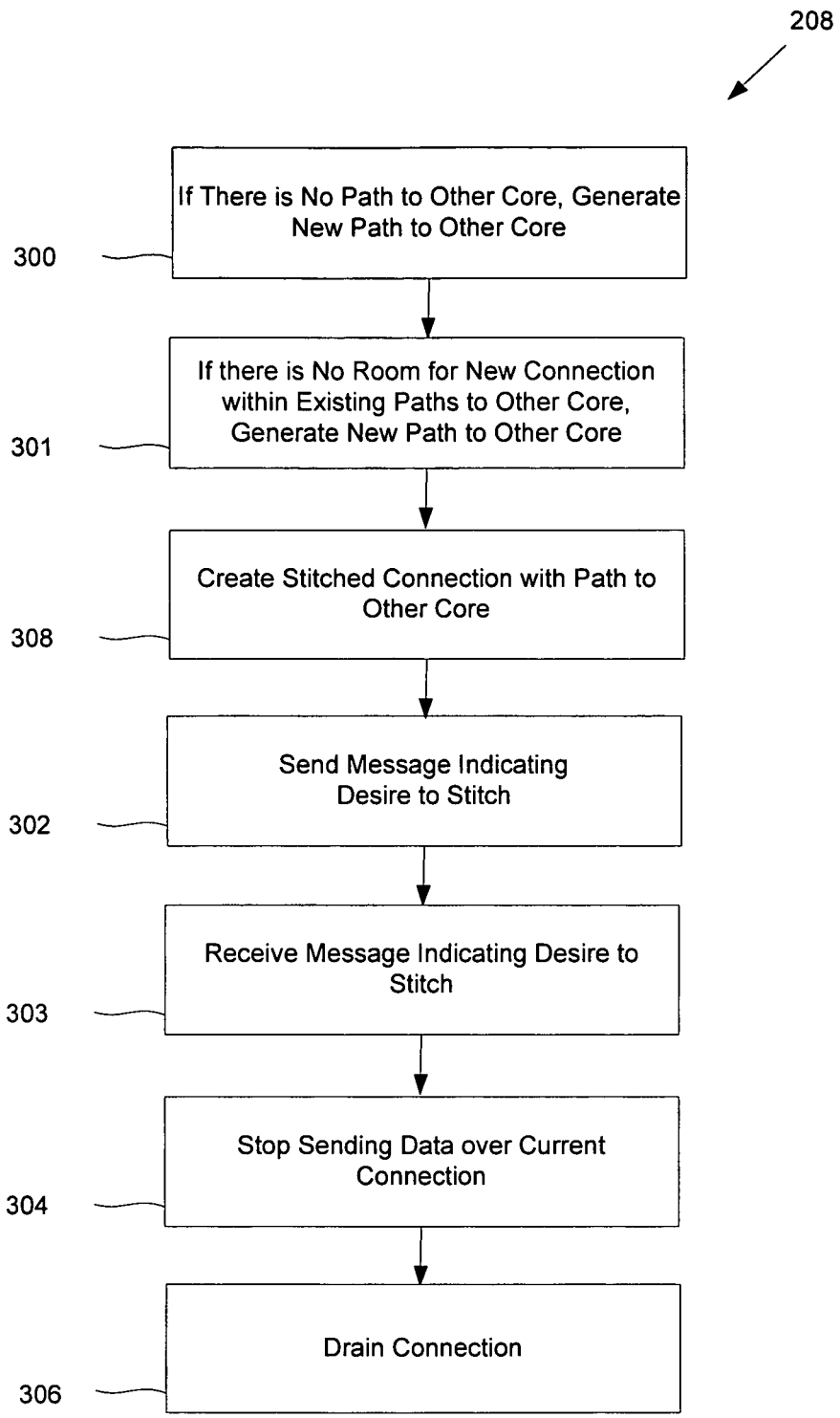
FIG. 3 is a flowchart illustrating a method of generating a stitched connection.

FIG. 3 is a flowchart illustrating a method of generating a stitched connection. In some embodiments, this process is used to perform (208). For example, if a match is detected between messages from core VM 156 and core VM 158, either core VM 156 or core VM 158 could perform this process. In this example, if there is no path to the other core, a new path to the other core is generated (300). If there is no room for a new connection within existing paths to the other core, a new path to the other core is generated (301). A stitched connection with the path to the other core is created (308). A message indicating a desire to stitch is sent (302). A message indicating a desire to stitch is received (303). In the case in which core VM 156 and core VM 158 both send the message, each will receive the other's message. Data is no longer sent over the current connection (304). In the case of system 150, data is no longer sent from core VM 156 to core VM 158 over path 164. Likewise, data is no longer sent from core VM 158 to core VM 156 over path 166. The data could be buffered in the meantime. The connection is drained (306). Draining refers to the process of waiting for all data in paths 162-166 to be received by core VM 156 and/or core VM 158. Data in transit from core VM 156 to core VM 158 over paths 162-166 is "drained" to core VM 158. Data in transit from core VM 158 to core VM 156 is "drained" to core VM 156. The draining process can be performed in any number of ways, as more fully described below. The drain process is optional and can be skipped. In some embodiments, data can be sent over the stitched connection (210) without first draining the original connection.

In some embodiments, (302) is performed by one core VM and (303) is performed by the other core VM. For example, in the case of system 150, either core VM 156 or core VM 158 can initiate the stitch. In some embodiments (302) is performed by one core VM and that core VM is selected based on a policy. For example, the policy could be such that the core VM whose message contains a lower global identifier number is the one that initiates the stitch.

In some embodiments, stitching is directed by applications through an application programming interface (API) that allows applications to control when to stitch, and which connections to stitch. Such an API can also perform match detection. The applications could communicate between themselves, decide to stitch a connection, and instruct the VMs to stitch using an API, without having to perform a publishing and matching mechanism. A predetermined configuration or agreement could be used so that no additional communication is necessary. For example, fixed, pre-configured ports could be stitched.

Figure 4:
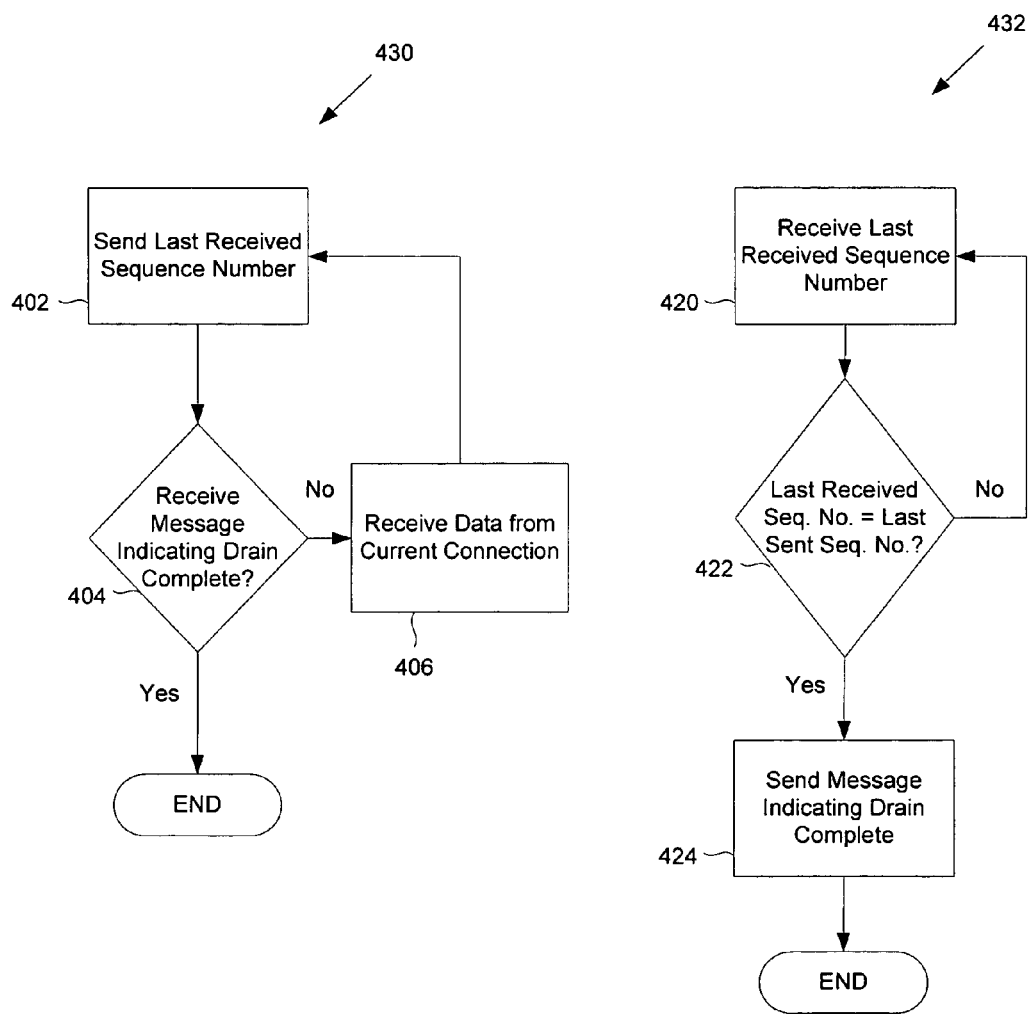
FIG. 4 is a flowchart illustrating a draining process.

FIG. 4 is a flowchart illustrating a draining process. In some embodiments, this process can be used to perform (306). For example, in system 150, both core VM 156 and core VM 158 perform this process. In this example, a draining process is shown for a reliable, in-order connection, such as TCP. Other examples of draining processes follow.

In this example, "local core VM" refers to the core VM performing this process. For example, core VM 156 could perform this process to drain data in transit from core VM 156 to core VM 158. In this case, core VM 156 is the "local core VM" and core VM 158 is the "other core VM". Likewise, core VM 158 could perform this process to drain data in transit from core VM 158 to core VM 156, in which case, core VM 158 is the "local core VM" and core VM 156 is the "other core VM". In this example, messages between the two VMs contain sequence numbers. A sequence number can be a message count, byte number, byte count, or any other number that can be used to determine whether a connection is drained.

Process 306 includes two parallel processes: process 430 and process 432. In process 430, a last received sequence number is sent (402) to the other core VM. The message could be sent over the stitched connection or over the original connection. For example, in system 150, the message could be sent over path 162-164 or over stitched connection 168. The message could be acknowledgement (ACK) message containing the sequence number. In process 432, a last received sequence number is received (420) from the other core VM. (i.e., the local core VM receives the message sent from the other core VM in (402).) It is determined whether the last received sequence number is the last sent sequence number (422). For example, the local core VM could maintain a record of the messages it has sent and make the determination based on the record. In some embodiments, each core VM maintains the sequence number last sent and the sequence number last received. In some embodiments, each core VM maintains a record of the messages that have been sent or received since the channel started.

If it is determined that the last received sequence number is the last sent sequence number, the data in transit from the local core VM to the other core VM has been drained. A notification that the drain process is complete in the direction from the local core VM to the other core VM is sent (424) to the other core VM. If the last received sequence number is not equal to the last sent sequence number, more data is still in transit in the direction from the local core VM to the other core VM. The process returns to (420), in which another received sequence number is received.

Returning to the process 430, it is determined whether a notification that the drain process is complete is received (404) from the other core VM. (i.e., it is determined whether the local core VM receives a notification sent from the other core VM in (424).) If such a message is received, then the drain process is complete in the direction from the local core VM to the other core VM. Otherwise, more data is still in transit in this direction. Data is received from the current connection (406) from the other core VM. The process returns to (402), in which the last received sequence number from the received message is sent (402) to the other core VM. In some embodiments, if data is not received in (402) and/or (420) after a certain time interval, the process ends, and it is assumed that the drain process is complete.

In the case of an unreliable connection such as UDP, there are other approaches that can be taken to drain the connection. There can be a stand-off period during which no data is sent over the connection. After the stand-off period expires, it is assumed that the connection has been drained. For example, the stand-off period can be selected such that it is highly likely that any data sent before the stand-off began is received by the time the stand-off period expires. Alternatively, all received messages containing a sequence number less than a certain sequence number can be dropped.

In some embodiments, once the stitched connection is in use, the original connection (e.g., path 162-166) is terminated. In some embodiments, the original connection is maintained. For example, periodically a heartbeat message can be sent over the original connection, and an acknowledgement sent in response. In the event that the original connection is terminated, the stitched connection is also terminated. For example, one of the proxies (shell VMs) could terminate or a firewall could be inserted in path 164. To the application running on the VM, the stitched connection behaves more like the original connection in this way, thereby improving the transparency of the stitched connection.

Although, the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of stitching a proxied connection between a first core virtual machine (VM) and a second core VM, including:
    establishing the proxied connection between the first core VM and the second core VM, the proxied connection connecting the first core VM and the second core VM via a first shell VM and a second shell VM;
    determining that a stitched connection should be generated between the first core VM and the second core VM, including:
    publishing a first connection description from the first core VM and a second connection description from the second core VM; and
    determining that a source associated with the first connection description corresponds to a destination associated with the second connection description, and a destination associated with the first connection description corresponds to a source associated with the second connection description; and
    generating the stitched connection between the first core VM and the second core VM for replacing the proxied connection, wherein information is transferred over the stitched connection instead of the proxied connection, thereby bypassing the first shell VM and the second shell VM.

2. A method as recited in claim 1, further including receiving a second connection description from the second core VM.

3. A method as recited in claim 1, wherein a server receives a first connection description from the first core VM.

4. A method as recited in claim 1, wherein a server receives a first connection description from the first core VM and a second connection description from the second core VM and determines that there is a match.

5. A method as recited in claim 1, wherein determining includes receiving an indication of a match from a server.

6. A method as recited in claim 1, wherein the first core VM includes a conduit that terminates a TCP connection.

7. A method as recited in claim 1, wherein the first core VM includes a portion of a VM that communicates through a proxy.

8. A method as recited in claim 1, further including broadcasting or multicasting a first connection description from the first core VM.

9. A method as recited in claim 1, further including publishing a first connection description from the first core VM, wherein publishing includes sending a message to a subscriber.

10. A method as recited in claim 1, further including publishing a first connection description from the first core VM, wherein publishing includes sending a Java Messaging System (JMS) message.

11. A method as recited in claim 1, wherein the first and second core VMs reside on a core device.

12. A method as recited in claim 1, wherein the first and second core VMs communicate through a shared memory interface.

13. A method as recited in claim 1, wherein the first or second core VM is associated with a long-lived connection.

14. A method as recited in claim 1, further including draining a connection associated with the first or second core VM.

15. A method as recited in claim 1, further including draining a connection associated with the first core VM, wherein draining includes receiving an indication that a final message has been received by the second core VM.

16. A method as recited in claim 1, further including draining a connection associated with the first core VM, wherein draining includes waiting for a stand-off period to expire.

17. A method as recited in claim 1, further including draining a connection associated with the first core VM, wherein draining includes dropping a message with a sequence number less than a designated sequence number.

18. A method as recited in claim 1, wherein a connection description includes a 4-tuple or 5-tuple.

19. A method as recited in claim 1, further including sending a message at designated times to detect whether a connection associated with the first or second core VM is alive.

20. A method as recited in claim 1, wherein the stitched connection is terminated in the event that a connection associated with the first or second core VM is terminated.

21. A method as recited in claim 1, wherein the stitched connection is transparent to an application running on the first or second core VM.

22. A method as recited in claim 1, wherein the first and second core VM's are within the same matching scope.

23. A method as recited in claim 1, wherein the first and second core VM's are within the same matching scope and wherein the matching scope is defined by a policy.

24. A method as recited in claim 1, wherein the first core VM or the second core VM is associated with a reliable connection.

25. A method as recited in claim 1, wherein the first core VM or the second core VM is associated with an in-order connection.

26. A method as recited in claim 1, further including instructing the first core VM to generate the stitched connection.

27. A method as recited in claim 1, wherein an Application Programming Interface (API) exposed to an application running on the first or second core VM generates the stitched connection.

28. A method as recited in claim 1, wherein the stitched connection is generated based on a predetermined configuration.

29. A computer program product for stitching a proxied connection between a first core virtual machine (VM) and a second core VM, the computer program product being embodied in a computer-readable medium and comprising computer instructions for:
   establishing the proxied connection between the first core VM and the second core VM, the proxied connection connecting the first core VM and the second core VM via a first shell VM and a second shell VM;
   determining that a stitched connection should be generated between the first core VM and the second core VM, including:
      publishing a first connection description from the first core VM and a second connection description from the second core VM; and
      determining that a source associated with the first connection description corresponds to a destination associated with the second connection description, and a destination associated with the first connection description corresponds to a source associated with the second connection description; and
   generating the stitched connection between the first core VM and the second core VM for replacing the proxied connection, wherein information is transferred over the stitched connection instead of the proxied connection, thereby bypassing the first shell VM and the second shell VM.

30. A system for stitching a proxied connection between a first core virtual machine (VM) and a second core VM, including:
   one or more processors configured to:
      establish the proxied connection between the first core VM and the second core VM, the proxied connection connecting the first core VM and the second core VM via a first shell VM and a second shell VM;
      determine that a stitched connection should be generated between the first core VM and the second core VM, including:
         publishing a first connection description from the first core VM and a second connection description from the second core VM; and
         determining that a source associated with the first connection description corresponds to a destination associated with the second connection description, and a destination associated with the first connection description corresponds to a source associated with the second connection description; and
      generate the stitched connection between the first core VM and the second core VM for replacing the proxied connection, wherein information is transferred over the stitched connection instead of the proxied connection, thereby bypassing the first shell VM and the second shell VM; and
   a memory coupled with the processor, wherein the memory provides the processor with instructions.

* * * * *